United States Patent [19]

Makita et al.

[11] Patent Number: 4,874,462
[45] Date of Patent: Oct. 17, 1989

[54] METHOD OF FORMING PATTERNED FILM ON SUBSTRATE SURFACE BY USING METAL ALKOXIDE SOL

[75] Inventors: Kensuke Makita, Mie; Akimasa Hattori, Matsusaka; Katsuto Tanaka, Matsusaka, all of Japan

[73] Assignee: Central Glass Company, Limited, Ube, Japan

[21] Appl. No.: 281,269

[22] Filed: Dec. 8, 1988

[30] Foreign Application Priority Data

Dec. 9, 1987 [JP] Japan ................................ 62-309389

[51] Int. Cl.$^4$ .................. B44C 1/22; C03C 15/00; C03C 25/06; C23F 1/02
[52] U.S. Cl. .............................. 156/635; 156/651; 156/655; 156/657; 156/659.1; 156/667
[58] Field of Search .............. 156/635, 638, 651–653, 156/654, 655, 656, 657, 659.1, 667, 904

[56] References Cited

U.S. PATENT DOCUMENTS 3,483,027  12/1969  Ritzerfeld et al. ............. 156/658 X
4,348,255   9/1982  Schmidt ............................ 156/656

FOREIGN PATENT DOCUMENTS 59-6541  1/1984  Japan .
60-1711  1/1985  Japan .

Primary Examiner—William A. Powell
Attorney, Agent, or Firm—Fleit, Jacobson, Cohn, Price, Holman & Stern

[57] ABSTRACT

The invention relates to a sol-gel method for forming a patterned film of a metal compound, e.g. $TiO_2$, $SiO_2$, $ZrO_2$, $Al_2O_3$, TiN or $Si_3N_4$, on a substrate by applying a metal alkoxide sol to the substrate, allowing the sol film on the substrate to turn into a gel film by hydrolysis, removing the gel film in the unnecessary area(s) by selective etching and baking the gel film in the remaining area(s). The selective etching of the gel film is easily accomplished by the steps of moistening the gel film in the unnecessary area(s) with a viscous liquid containing, e.g., an organic solvent or an organic acid, hardening the gel film in the remaining area(s) by mild heating, and then removing the gel film in the unnecessary area(s) by washing with a suitable liquid such as an alkali solution or, when said viscous solution contains an organic acid and water, water.

21 Claims, No Drawings

METHOD OF FORMING PATTERNED FILM ON SUBSTRATE SURFACE BY USING METAL ALKOXIDE SOL

BACKGROUND OF THE INVENTION

This invention relates to a method of forming a patterned coating film of a metal compound such as oxide or nitride on a substrate surface by a sol-gel method using a metal alkoxide sol, the method incorporating a selective etching process.

For various purposes including electronics, optics and ornaments, currently it is a very important process to form a think film of oxide, nitride or semiconductive material on a substrate surface in a desired pattern, and various methods are known for accomplishment of patterned coating. For example, in a PVD method such as vacuum evaporation or sputtering it is often to provide the substrate with masking in a desired pattern.

Also it is prevailing to first form a coating film over the entire area of the substrate surface and then remove the film in the unnecessary areas by an etching treatment. For example, in the case of a film of $SnO_2$ or $In_2O_3$- $SnO_2$ the etching treatment includes overlaying the film with a resist layer, patterning the resist layer by photolithography and then etching the oxide film masked with the resist by using a suitable etchant such as an aqueous solution of an acid or a metal chloride or hydrogen gas generated by reaction of a metal powder with an acid. For some applications patterning of a coating film by laser beam scanning is also known.

However, these conventional patterning methods are not always very effective for patterning of thin films of some oxides such as $SiO_2$, $TiO_2$, $ZrO_2$ and $Al_2O_3$ or corrosion resistant nitrides such as TiN and SiN, and in some methods the use of a harmful and corrosive etchant such as hydrofluoric acid offers a serious problem.

Recently growing interest has been shown in the applications of a so-called sol-gel method to forming of patterned coating films. In a sol-gel method a coating film of a metal alkoxide sol is gelled by hydrolysis on a substrate surface, and then the gel film is baked to accomplish pyrolysis. There are some proposals as to the ethching method to be combined with a sol-gel method. For example, JP-A 59-6541 proposes first hardening a metal alkoxide gel film on a substrate surfadce by heating, overlaying the hardened film with a resist film, patterning the resist film by lithography to use it as a mask and etching the hardened film in the unnecessary areas with, e.g, a reactive gas. JP-A 60-1711 proposes first hardening a silicon alkoxide gel film on a substrate surface by a mild heat treatment, forming a patterned film of an alkali resistant resist on the hardened film by screen printing and etching the hardened film in the unnecessary areas with an alkali solution.

As represented by the above Japanese publications, it is a common thought to harden an alkoxide gel film by a heat treatment in advance of making an etching treatment using a patterned resist film as masking. However, the hardening affords the coating film some resistance to corrosion, whereby the subsequent etching becomes rather low in efficiency. Therefore it is necessary to continue the etching operation for a long time and/or use a very corrosive acid or alkali as etchant, and such intense etching offers difficulty to precise patterning because even in the masked areas the hardened film is liable to undergo erosion to some extent.

SUMMARY OF THE INVENTION

It is an object of the present invention to provide a method for easily and efficiently forming a desirably patterned coating film of a metal compound on a substrate surface, which method uses a metal alkoxide sol and incorporates selective etching by a novel technique.

The present invention provides a method of forming a patterned film of an inorganic metal compound on a substrate, the method having the steps of applying a metal alkoxide sol to a substrate to form a sol film on the substrate, allowing the sol film to turn into a gel film by hydrolysis of the metal alkoxide, removing the gel film in the unnecessary area(s) by selective etching, and then baking the film in the remaining area(s) to completely convert the material of the film into the desired inorganic metal compound. The method according to the invention is characterized in that the selective etching of the gel film is made by the steps of applying a viscous liquid, which is capable of at least partially decomposing the gel film, to the gel film in the unnecessary area(s) and allowing the applied viscous liquid to permeate into and moisten the underlying gel film, heating the gel film which is moistened with the viscous liquid in the unnecessary area(s) at a temperature lower than 300° C. to thereby harden the gel film in the necessary area(s), and removing the gel film in the unnecessary area(s) by washing with at least one washing liquid.

For example, the viscous liquid used in this invention contains an organic solvent which is soluble in the metal alkoxide sol and in which the alkoxide sol is soluble, and/or an organic acid.

By the mild heating after applying the viscous liquid into the gel film in the unneccessay area(s), the gel film in the ncessary area(s) is hardened to become resistant to the washing liquid(s) used in the subsequent step. For example, an alkali solution is used as a washing liquid. In some cases where the viscous liquid contains an aqueous solution of organic acid and is very effective for decomposition of the underlying gel film, it suffices to use water alone as the washing liquid.

By using the present invention patterning of coating films forming a sol-gel method can easily and economically be accomplished without using a very harmful and strongly corrosive etchant. This invention is applicable to the formation of patterned films of various oxides and nitrides such as, for example, $TiO_2$, $SiO_2$, $ZrO_2$, $Al_2O_3$, TiN, SiN and $Si_3,N_4$ and for various purposes including conductor films, semiconductor films and dielectric films in electronics, refractive films and selectively reflective films in optics and colored films in ornaments.

DESCRIPTION OF THE PREFERRED EMBODIMENTS

Metal alkoxides used in conventional sol-gel methods can be used in the present invention. Usually an alkoxide of Ti, Si, Zr or Al is used, and usually the alkoxide is selected from methoxide, ethoxide, propoxide and butoxide. The preparation of a metal alkoxide gel is also as in conventional sol-gel methods. Usually an alcohol is used optionally together with another organic solvent and/or water.

A selected metal alkoxide sol is applied to a substrate by any of well known coating methods, and the sol film on the substrate is allowed to gel by hydrolysis of the metal alkoxide with either water contained in the sol or moisture in the air. This is accomplished by leaving the sol film to natural drying at normal temperature or by drying the sol film at a temperature lower than 100° C. The gel film assumes a solid state at least in its surface, but this film still contains considerable amounts of alkyl group, hydroxyl group, etc. and hence is not a very stable film. The gel film in this state may be called a wet gel film.

Next, a viscous liquid is applied onto the wet gel film in the unnecessary area(s) by a suitable coating method using a patterned mask or by the technique of screen printing. The viscous liquid contains a liquid substance which is cabaple of at least partially decomposing the gel film. An example of such a liquid substance is an organic solvent which is soluble in the employed alkoxide sol, and vice versa. Such a solvent can be selected from acetic esters, ketones, and alcohols. To provide a suitable viscosity, a soluble resin such as an alcohol soluble phenolic resin or a rosin modified maleic acid resin is together with an organic solvent. Optionally, an organic acid such as acetic acid, oxalic acid, citric acid or propionic acid or an alkali such as sodium hydroxide or ammonia may be added to a viscous liquid using an organic solvent and a resin. In the case of adding an organic acid or an alkali, it is preferable to add water too. Another example of the liquid substance as the essential component of the viscous liquid is a combination of water and an organic acid such as acetic acid, oxalic acid, citric acid or propionic acid. In this case it is suitable to use a glycol such as polyethylene glycol or propylene glycol as a viscosity increasing agent, optionally together with an inorganic filler such as ceria powder, barium sulfate powder or talc.

By application of the viscous liquid the gel film in the unnecessary area(s) is moistened and becomes very easily disintegratable or peelable. A viscous liquid is used so that the gel film in the necessary area(s) may not be moistened and decomposed. This requirement can be met when the viscosity of the applied viscous liquid is above about 100 poises at normal temperature. On the other hand, the viscous liquid is required to have adequate fluidity so that the liquid may be convenient for a coating or printing operation. Therefore, it is preferable that the viscosity of the viscous liquid is not higher than 1000 poises at normal temperature.

After moistening the gel film in the unnecessary area(s) with the viscous liquid, the gel film on the substrate is heated at a temperature lower than 300° C. and usually higher than 150° C. This heat treatment is for the purpose of decomposing and dissipating the aforementioned alkyl group, hydroxyl group, etc. and thereby converting the wet gel film in the necessary area(s) into a hard film of a metal oxide. Since the heating temperature is relatively low, the hardened film remains in a porous and rather fraggile state. However, the hardended film is sufficiently resistant to the washing liquid used in the next step.

After the above heat treatment, the partially decomposed gel film in the unnecessary area(s) is removed, together with residue of the viscous liquid, by washing with a suitable liquid. For example, an aqueous alkali solution such as an aqueous solution of sodium hydroxide is used as the washing liquid. If necessary for complete removal of the gel film or its residue, the alkali washing may be followed by washing with an acid solution. In some cases, as mentioned hereinbefore, the object can be accomplished by using water alone as the washing liquid.

After the above operations the hardened film remains on the substrate surface in the desired pattern. Then the substrate is subjected to baking to turn the hardened film into a sufficiently dense film of the desired metal oxide or nitride. Usually the baking is made at a temperature higher than 400° C. in an oxygencontaining gas atmosphere in the case of producing an oxide film and in a nitrogen-containing gas atmosphere in the case of producing a nitride film.

The invention is further illustrated by the following nonlimitative examples.

EXAMPLE 1

An alkoxide solution was prepared by adding isopropanol and ethyl cellosolve to titanium isopropoxide and well stirring the mixture. A well cleaned soda-lime glass plate 2 mm in thickness and 30 cm×30 cm in widths was dipped into the alkoxide solution and then pulled out at a constant rate of 5 mm/sec. The wetted glass plate was left drying at room temperature to thereby form a gel film on each side of the glass plate.

Separately a paste was prepared by mixing a rosin modified maleic acid resin with 10 wt % of a liquid mixture of ethyl cellosolve and n-propyl acetate and kneading the mixture. At room temperature the viscosity of the resin paste was about 100-200 poises.

By screen printing the above paste was applied to the gel film on the glass plate in such a pattern as to cover unnecessary areas of the gel film. After that the glass plate was subjected to a heat treatment at 200° C. for 5 min. By the heat treatment the gel film in the exposed areas turned into a hard film. After cooling, the threated glass plate was washed into aqueous solution of sodium hydroxide (1N) to partially dissolve and peel the gel film in the areas covered with the paste. Then the glass plate was washed with aqueous solution of sulfuric acid (1N) to completely dissolve and remove the residues of the gel film. In the areas not precedingly covered with the paste the hard film was fully resistant to the washing liquids.

After the washing treatments the glass plate with the hard film thereof was baked at 550° C. for about 1 hr until the hard film turned into a $TiO_2$ film. The obtained $TiO_2$ film was in the desired pattern and had a thickness of about 0.1 $\mu$m. This film assumed a pale purplish blue color and exhibited a highly reflective characteristic. The refractive index of the film was about 2.2.

EXAMPLE 2

The resin paste prepared in Example 1 was modified by adding 10 wt % of aqueous solution of citric acid (concentration 10 wt %).

Using the thus modified paste in place of the paste used in Example 1, the pattern forming process of Example 1 was repeated with another modification in the following point. In this case, the gel film in the unnecessary areas easily decomposed by moistening with the paste containing adequate amounts of water and acid. Therefore, after the initial heat treatment at 200° C. the removal of the gel film in the unnecessary areas could easily be accomplished by merely washing with water.

The results of the pattern forming process of this example was similar to the result in Example 1. On the glass plate a good $TiO_2$ film was formed in the desired pattern.

EXAMPLE 3

An aqueous paste was prepared by mixing 10 wt % of water, 10 wt % of citric acid, 9 wt % of polyethylene glycol and 71 wt % of cerium oxide in fine powder form.

Using this paste in place of the resin paste in Example 1, the pattern forming process of Example 1 was repeated with another modification in the following point. In this case, the gel film in the unnecessary areas easily decomposed by moistening with the aqueous paste containing an acid, adn the paste itself was easily dispersible in water. Therefore, after the heat treatment at 200° C. the removal of the gel film in the unnecessary areas could easily be accomplished by merely washing with water. Since the paste contained no organic solvent the etching operations could be performed without care to avoid ignition of the paste or evaporated solvent.

Also in this example a good $TiO_2$ film was obtained in the desired pattern on the glass plate.

EXAMPLE 4

A quartz glass plate was used in place of the sodalime glass plate in Example 1 , and the pattern forming process of Example 1 was repeated until the stage of completely removing the gel film in the unnecessary areas by repeated washing. Then the quartz glass plate with the hard film in the desired pattern thereon was heated in an ammonia gas stream at 950° C. for 1 hr. As the result the hard film turned into a TiN film which was in the desired pattern. The TiN film had electrical conductivity and exhibited good wear resistance and durability.

What is claimed is:

1. In a method of forming a patterned film of an inorganic metal compound on a substrate, the method having the steps of applying a metal alkoxide sol to a substrate to form a sol film on the substrate, allowing the sol film to turn into a gel film by hydrolysis of the metal alkoxide, removing the gel film in the unnecessary area or areas by selective etching, and then baking the film in the remaining area or areas to completely convert the material of the film into the desired inorganic metal compound.

the improvement comprising making said selective etching by the steps of applying a viscous liquid, which is capable of at least partially decomposing the gel film, to the gel film in the unnecessary area or areas and allowing the applied viscous liquid to permeate into and moisten the underlying gel film, heating the gel film which is moistened with said viscous liquid in the unnecessary area or areas at a temperature lower than 300° C. to thereby harden the gel film in the necessary area or areas, and removing the gel film in the unnecessary area or areas together with the residue of the applied viscous liquid by washing with at least one washing liquid.

2. A method according to claim 1, wherein said viscous liquid comprises an organic solvent which is soluble in said metal alkoxide sol, and vice versa.

3. A method according to claim 2, wherein said orgnanic solvent is selected from the group consisting of acetic esters, ketones, and alcohols.

4. A method according to claim 3, wherein said at least one washing liquid comprises an alkali solution.

5. A method according to claim 3, wherein said viscous liquid further comprises a resin.

6. A method according to claim 5, wherein said viscous liquid further comprises an organic acid.

7. A method according to claim 6, wherien said orgnanic acid is selected from the group consisting of acetic acid, oxalic acid, citric acid and propionic acid.

8. A method according to claim 6, wherein said viscous liquid further comprises water.

9. A method according to claim 8, wherein water alone is used as said at least one washing liquid.

10. A method according to claim 3, wherein said viscous liquid further comprises an alkali and water.

11. A method according to claim 1, wherein said viscous liquid comprises an organic acid, water and a viscosity increasing agent.

12. A method according to claim 11, wherein said organic acid is selected from the group consisting of acetic acid, oxalic acid, citric acid and propionic acid.

13. A method according to claim 11, wherein said viscosity increasing agent is a glycol.

14. A method according to claim 11, wherein said viscous liquid further comprises an inorganic filler.

15. A method according to claim 11, wherein said at least one washing liquid comprises an alkali solution.

16. A method according to claim 11, wherein water alone is used as said at least one washing liquid.

17. A method according to claim 1, wherein the viscosity of said viscous liquid at normal temperature is from 100 to 1000 poises.

18. A method according to claim 1, wherein said viscous liquid is applied onto said gel film by screen printing.

19. A method according to claim 1, wherein the metal alkoxide is selected from the group consisting of titanium alkoxides, silicon alkoxides, zirconium alkoxides and aluminum alkoxides.

20. A metal according to claim 19, wherein said metal compound is a metal oxide, the baking step being carried out in an oxygen-containing gas atmosphere.

21. A method according to claim 19, wherein said metal compound is a metal nitride, the baking step being carried out in a nitrogen-containing gas atmosphere.

* * * * *